(12) United States Patent
Park

(10) Patent No.: US 10,286,808 B2
(45) Date of Patent: May 14, 2019

(54) VEHICLE AND METHOD FOR CONTROLLING THE SAME

(71) Applicants: Hyundai Motor Company, Seoul (KR); Kia Motors Corporation, Seoul (KR)

(72) Inventor: Seon Young Park, Paju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/598,066

(22) Filed: May 17, 2017

(65) Prior Publication Data

US 2018/0170208 A1  Jun. 21, 2018

(30) Foreign Application Priority Data

Dec. 19, 2016  (KR) .................. 10-2016-0173438

(51) Int. Cl.
| | | |
|---|---|---|
| H02J 7/00 | (2006.01) | |
| B60L 11/18 | (2006.01) | |
| H01M 10/44 | (2006.01) | |
| H01M 10/625 | (2014.01) | |
| H01M 10/615 | (2014.01) | |
| B60L 53/00 | (2019.01) | |
| B60L 58/27 | (2019.01) | |

(52) U.S. Cl.
CPC ........... *B60L 11/1875* (2013.01); *B60L 53/00* (2019.02); *B60L 58/27* (2019.02); *H01M 10/443* (2013.01); *H01M 10/615* (2015.04); *H01M 10/625* (2015.04); *H02J 7/007* (2013.01); *H02J 7/0047* (2013.01); *H01M 2220/20* (2013.01); *H02J 2007/005* (2013.01); *Y02T 10/705* (2013.01); *Y02T 10/7005* (2013.01); *Y02T 10/7072* (2013.01); *Y02T 90/14* (2013.01)

(58) Field of Classification Search
CPC ..................................................... H02J 7/0047
USPC ......................................................... 320/150
See application file for complete search history.

(56) References Cited

U.S. PATENT DOCUMENTS

| | | | |
|---|---|---|---|
| 2009/0153104 A1* | 6/2009 | Matsuura .............. | H02J 7/0091 320/153 |
| 2015/0255998 A1* | 9/2015 | Hasegawa ............... | B60L 58/16 320/107 |
| 2016/0023563 A1* | 1/2016 | Wang ...................... | B60L 58/24 320/129 |
| 2017/0232864 A1* | 8/2017 | Kim .................... | B60L 11/1866 307/10.7 |

(Continued)

FOREIGN PATENT DOCUMENTS

JP  2001314039 A  11/2001

*Primary Examiner* — Suchin Parihar
(74) *Attorney, Agent, or Firm* — Slater Matsil, LLP

(57) ABSTRACT

A method can be used for charging a battery of a vehicle. The method includes performing a first charging process in which the battery is charged with a maximum amount of charges corresponding to a current temperature of the battery, the battery being heated while performing the first charging process. The method also includes performing a heating process in which the battery is heated without charging of the battery, and performing a second charging process in which, when the maximum amount of charges of the battery increases by heating of the battery, the battery is further charged with the increased maximum amount of charges.

16 Claims, 4 Drawing Sheets

(56) References Cited

U.S. PATENT DOCUMENTS

2017/0267116 A1* 9/2017 Lindemann ......... B60L 11/1809
2017/0365901 A1* 12/2017 Hiramitsu ........... H01M 8/0432
2018/0170208 A1* 6/2018 Park ................... B60L 11/1875

* cited by examiner

VEHICLE AND METHOD FOR CONTROLLING THE SAME

CROSS-REFERENCE TO RELATED APPLICATIONS

This application claims the benefit of Korean Patent Application No. 10-2016-0173438, filed on Dec. 19, 2016 in the Korean Intellectual Property Office, the disclosure of which is incorporated herein by reference.

TECHNICAL FIELD

Embodiments of the present disclosure relate to a vehicle and, in particular embodiments, to a method for controlling battery charging of an electric vehicle.

BACKGROUND

In pure electric vehicles designed to use a battery as an energy source, and engine hybrid electric vehicles and fuel-cell hybrid vehicles designed to use a battery as an energy buffer, the battery is one of the principal constituent elements for determining vehicle quality.

Therefore, a Battery Management System (BMS), which is configured to manage overall conditions of the battery, prevents early reduction in battery lifespan and transmits State of Charge (SoC) information of the battery to a vehicle controller configured to perform integrated control, thereby supporting electricity generation control and vehicle traveling control.

The principal function of the BMS may be to perform SoC estimation and a fully charged state of the battery, balanced voltage maintenance between cell modules, maximum charging and discharge voltage control based on battery SoC information, safety management, cooling control, and the like.

The amount of electric energy stored in the battery of the electric vehicle may denote an available range of the electric vehicle. In order to increase the range of electric vehicles, many electric vehicle manufacturers mainly increase battery capacity or enlarge an available SoC region of the battery.

The battery may have different performances according to battery temperature. Generally, a lithium (Li) battery has high resistance at a low temperature. Accordingly, since high resistance occurs when the battery is charged with electricity at a low temperature, the battery may be charged with a smaller charge as compared to the case in which the battery is charged with electricity at a normal or high temperature. In the electric vehicles, reduction in the electric charge stored in the battery may indicate reduction in the range of the electric vehicle.

SUMMARY

It is an aspect of the present disclosure to provide a vehicle for increasing the amount of charges of a battery even at low temperature, and a method for calculating an estimated time needed to charge the battery.

Additional aspects of the invention will be set forth in part in the description which follows and, in part, will be obvious from the description, or may be learned by practice of the invention.

In accordance with an aspect of the present disclosure, a method for charging a battery of a vehicle includes performing a first charging process in which the battery is charged with a maximum amount of charges corresponding to a current temperature of the battery and at the same time the battery is heated. A heating process is performed in which only heating of the battery is performed without charging of the battery. A second charging process is performed in which, when the maximum amount of charges of the battery increases by heating of the battery, the battery is further charged with the increased maximum amount of charges.

In accordance with another aspect of the present disclosure, the method may further include calculating a total estimated charge time needed for the first charging process, the heating process, and the second charging process, and displaying the calculated estimated charge time.

The method may further include calculating an estimated charge time of the first charging process on the basis of a maximum constant voltage corresponding to an initial temperature of the battery and the amount of a charge current.

A time needed to heat the battery from an initial temperature to a target temperature of the battery may be guaranteed in advance through experimental processing, and an estimated heating time of the heating process may be calculated on the basis of the result of the experimental processing.

An estimated charge time of the second charging process may be calculated in consideration of not only a State of Charge (SoC) of the battery obtained when the first charging process is completed, but also a maximum SoC of the battery.

The method may further include performing the first charging process, the heating process, and the second charging process during a low-temperature charge mode.

The method may further include entering the low-temperature charge mode, if the battery has a temperature less than a predetermined temperature.

In accordance with another aspect of the present disclosure, a method for charging a battery of a vehicle includes calculating a total estimated charge time to be consumed for performing a first charging process, a heating process, and a second charging process, and displaying the total estimated charge time. The first charging process is performed in which the battery is charged with a maximum amount of charges corresponding to a current temperature of the battery and at the same time the battery is heated. The heating process is performed in which only heating of the battery is performed without charging of the battery and a second charging process is performed in which, when the maximum amount of charges of the battery increases by heating of the battery, the battery is further charged with the increased maximum amount of charges.

The method may further include calculating an estimated charge time of the first charging process on the basis of a maximum constant voltage corresponding to an initial temperature of the battery and the amount of a charge current.

The method may further include previously acquiring a time needed to heat the battery from an initial temperature to a target temperature of the battery through experimental processing, and calculating an estimated heating time of the battery on the basis of the result of the experimental processing.

The method may further include: calculating an estimated charge time of the second charging process in consideration of not only a State of Charge (SoC) of the battery obtained when the first charging process is completed, but also a maximum SoC of the battery.

The method may further include: performing the first charging process, the heating process, and the second charging process during a low-temperature charge mode.

The method may further include: if the battery has a temperature less than a predetermined temperature, entering the low-temperature charge mode.

In accordance with another aspect of the present disclosure, a method for charging a battery of a vehicle includes calculating an estimated charge time of a first charging process on the basis of a maximum constant voltage corresponding to an initial temperature of the battery of the vehicle and an estimated charge time. A time needed to heat the battery from the initial temperature to a target temperature of the battery has been previously acquired through experimental processing. An estimated heating time of a heating process is calculated on the basis of the result of the experimental processing. An estimated charge time of a second charging process is calculated in consideration of not only a State of Charge (SoC) of the battery obtained when the first charging process is completed, but also a maximum SoC of the battery. An estimated consumption time of the first charging process, an estimated consumption time of the heating process, and an estimated consumption time of the second charging process are summed so as to calculate a total estimated charge time and the calculated total estimated charge time is displayed. The first charging process is performed in which the battery is charged with a maximum amount of charges corresponding to a current temperature of the battery and at the same time the battery is heated. The heating process is performed in which only heating of the battery is performed without charging of the battery. The second charging process is performed in which, when the maximum amount of charges of the battery increases by heating of the battery, the battery is further charged with the increased maximum amount of charges.

In accordance with another aspect of the present disclosure, a vehicle includes a motor, a battery configured to store power for driving the motor, and a controller configured to charge the battery with a maximum amount of charges corresponding to a current temperature of the battery as well as to heat the battery, perform only heating of the battery without charging of the battery, and if the maximum amount of charges of the battery increases by heating of the battery, further charge the battery with the increased maximum amount of charges.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF ILLUSTRATIVE EMBODIMENTS

Figure 1:
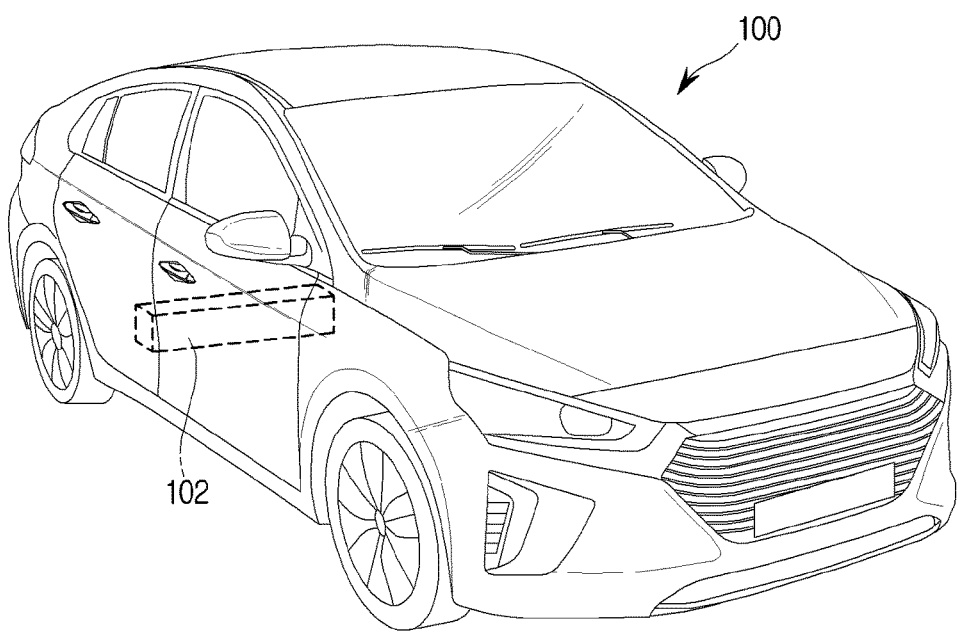
FIG. 1 is a perspective view illustrating the appearance of a vehicle according to an embodiment of the present disclosure.

Reference will now be made in detail to the embodiments of the present disclosure, examples of which are illustrated in the accompanying drawings, wherein like reference numerals refer to like elements throughout.

FIG. 1 is a perspective view illustrating the appearance of a vehicle according to an embodiment of the present disclosure. Referring to FIG. 1, a vehicle 100 may be a plug-in hybrid electric vehicle (PHEV) including an internal combustion engine and an electric motor. Alternatively, the vehicle 1 may be an electric vehicle (EV) including an electric motor only.

Since the vehicle 100 is a hybrid vehicle, a battery 102 for storing power needed to drive a motor (see FIG. 2) is needed. A large-sized high-capacity battery is needed for the hybrid vehicle whereas a battery is provided at one side of an engine compartment of a general internal combustion vehicle. In the vehicle 100 according to the embodiment, a battery 102 is installed at a lower space of a rear passenger seat at which a relatively larger-sized space can be guaranteed as compared to an engine compartment.

Figure 2:
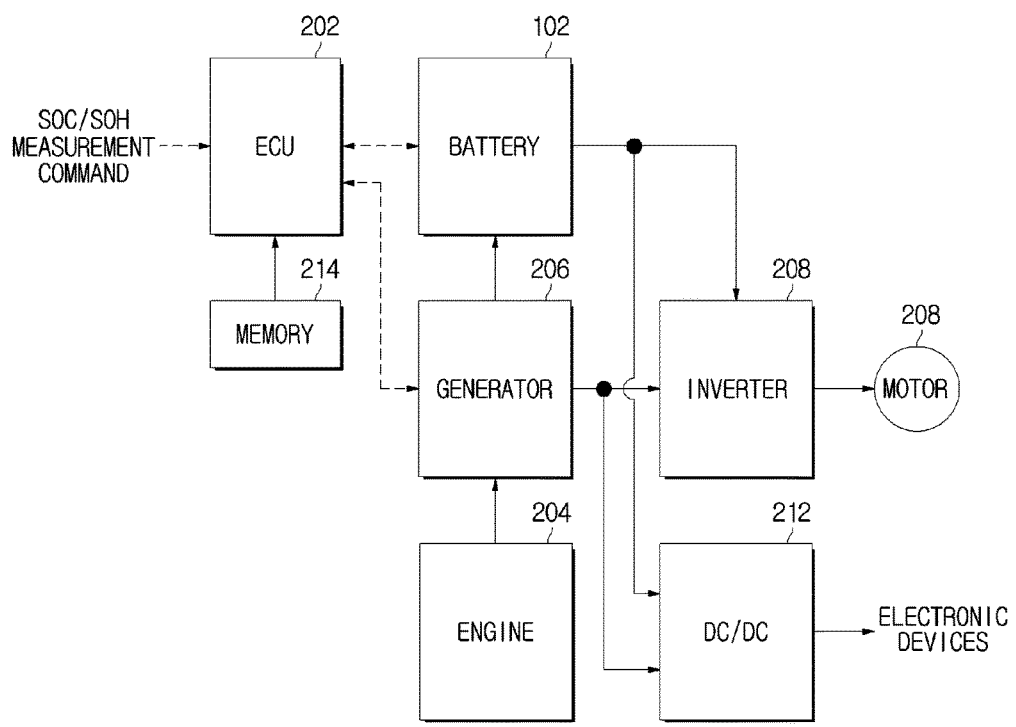
FIG. 2 is a block diagram illustrating a power system of the vehicle according to an embodiment of the present disclosure.

Power stored in the battery 102 may be used to generate power by driving the motor (see FIG. 2). The battery 102 according to the embodiment may be a lithium battery.

FIG. 2 is a block diagram illustrating a power system of the vehicle according to an embodiment of the present disclosure.

Referring to FIG. 2, an electronic control unit (ECU) 202 may be a controller for overall operation of the power system. The ECU 202 may be a controller of a battery management system (BMS) configured to control/manage charging and discharging of the battery 102. In the embodiment, the ECU 202 may receive SoC/SoH (State of Charge/ State of Health) associated commands, and may control the battery 102 and a generator 206 according to the received SoC/SoH commands.

State of Charge (SoC) may denote a current charge state of the battery 102. That is, the SoC may indicate the current charge of the battery 102. Namely, the SoC may indicate a current battery charge state denoted by percentage (%) with respect to a total charge capacity of the battery 102. The SoC may be considered identical to a fuel gauge of the vehicle equipped with an internal combustion engine.

State of Health (SoH) may denote life expectancy of the battery 102. Life expectancy (i.e., a desired life time) of the battery 102 may be gradually reduced in proportion to the increasing number of iteration times of battery charging and discharging. Therefore, since it is possible to recognize a maximum charge capacity of the battery 102 on the basis of life expectancy of the battery 102, there is a need to measure SOH of the battery 102.

In FIG. 2, dotted arrows among the ECU 202, the battery 102, and the generator 206 may illustrate flows of a control signal transmitted over a CAN communication network, and solid arrows may illustrate flows of electric power.

The engine 204 may generate power by burning fuel such as gasoline and/or diesel.

The generator 206 may be connected to an output shaft, may use power generated from the engine 204, and may generate electricity, thereby generating power.

The battery 102 may store power generated by the generator 206. Power stored in the battery 102 may be used as drive energy of the motor 210 to be described later.

An inverter 208 may convert a voltage of the battery 102 into multiphase AC power (also called polyphase AC power) (for example, 3-phase (composed of U-phase, V-phase, and W-phase) AC power) upon receiving a control signal from a drive part (not shown), and may provide the multiphase AC power to the motor 210.

The motor 210 may be driven by 3-phase AC power of the inverter 208, and may thus generate power (rotational force). The rotational force of the motor 210 may be used to rotate wheels of the vehicle 100.

A DC/DC converter 212 may boost DC power received from the battery 102 or the generator 206 to a predetermined voltage level. DC power generated from the DC/DC converter 212 may be applied to various electronic devices embedded in the vehicle 100.

A memory 214 may store data or software/firmware needed for ECU control. Specifically, the memory 214 may store information regarding a temperature and SoC of the battery 102 and information regarding a charge consumption time to be consumed for charging the battery 102.

Figure 3:
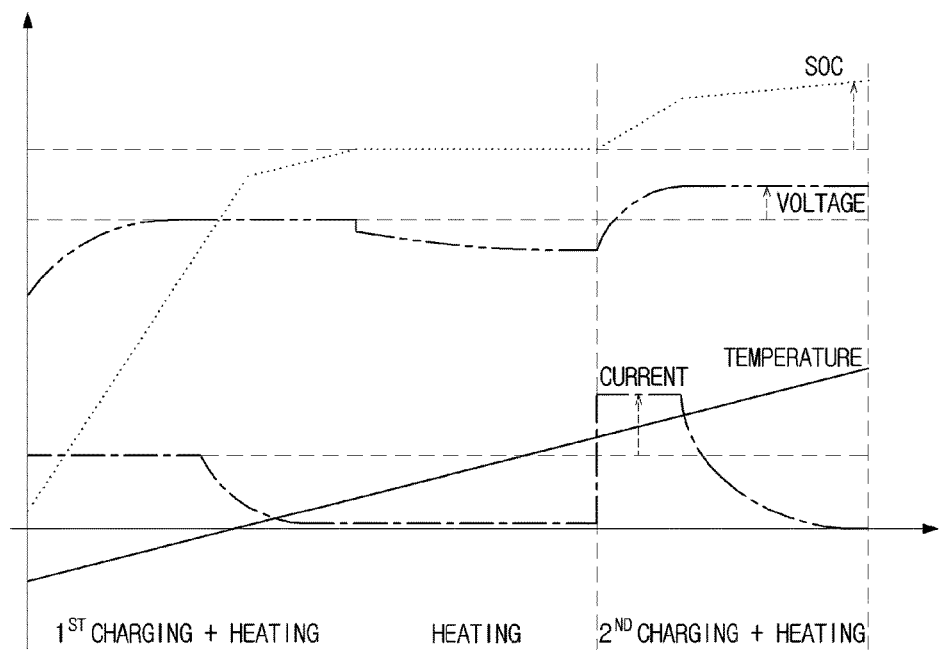
FIG. 3 is a graph illustrating a method for charging a battery of the vehicle according to an embodiment of the present disclosure.

FIG. 3 is a graph illustrating a method for charging a battery of the vehicle according to an embodiment of the present disclosure. Referring to FIG. 3, battery charging of the vehicle according to the embodiment may include three steps, i.e., <1st charging+heating>, <heating>, and <2nd charging+heating>. The battery 120 (especially, a lithium ion battery) has a high resistance at low temperature, such that it may be preferable that the battery 120 be heated to a room temperature or higher so as to more rapidly charge the battery with much more energy. However, assuming that the battery 102 is charged with electricity after being sufficiently heated, a standby time is increased such that a time needed to charge the battery 102 is also increased. As a result, according to the embodiment, charging and heating of the battery 102 are strategically arranged such that the battery 102 can be more rapidly charged with much more energy.

Referring to FIG. 3, the battery 102 may start charging. In this case, if the battery 102 has a relatively low temperature, the battery 102 may be charged with the amount of a charge current corresponding to the corresponding temperature such that the amount of charges stored in the battery 102 may increase to an upper limit value of a constant voltage mode.

If charging of the battery 102 starts, a charging system of the battery 102 and a heating system of the battery 102 may simultaneously operate. That is, the battery 102 starts charging and at the same time the heating system for heating the battery 102 operates, such that a temperature of the battery 102 increases.

The battery 102 may be charged with a maximum of a constant voltage corresponding to a current temperature of the battery 102, and <1st charging+heating> process is then completed. Since the battery 102 is not charged with at least a constant voltage corresponding to the current temperature, the battery 102 need not be charged any longer. In addition, assuming that the battery 102 is insufficiently heated and the battery 102 does not have a sufficiently high temperature, the <1st charging+heating> process may be completed under the condition that the battery 102 is not fully charged with the maximum SoC value.

An execution time of the <1st charging+heating> process may be calculated on the basis of not only the temperature of the battery 102 at a charging start time of the battery 102 but also the maximum constant voltage of a constant voltage mode.

In the <heating> process, the battery 102 may be sufficiently heated in a manner that the battery 102 can be charged with the maximum SoC value.

In association with a consumption time needed to heat the battery 102 to charge the battery 102 with the maximum SoC value, a time needed to heat the battery 102 from the start temperature to a target temperature may be guaranteed in advance through experimental processing, and may be configured in the form of a lookup table.

Upon completion of the <heating> process in which the battery 102 is heated to the target temperature at which the battery 102 can be charged with the maximum SoC value without charging of the battery 102, secondary charging (i.e., 2nd charging) begins and the battery 102 is continuously heated. If the battery 102 is heated to a sufficiently high temperature, heating of the battery 102 may be omitted in the secondary charging process.

Since the battery 102 has a sufficiently high temperature during secondary charging, the battery 102 can be charged with a maximum constant value (or the maximum SoC) of the constant voltage mode.

A time needed for <2nd charging+heating> may be calculated in consideration of a first SoC of the battery 102 and a maximum SoC of the battery 102 when the primary charging (1st charging) is completed.

Figure 4:
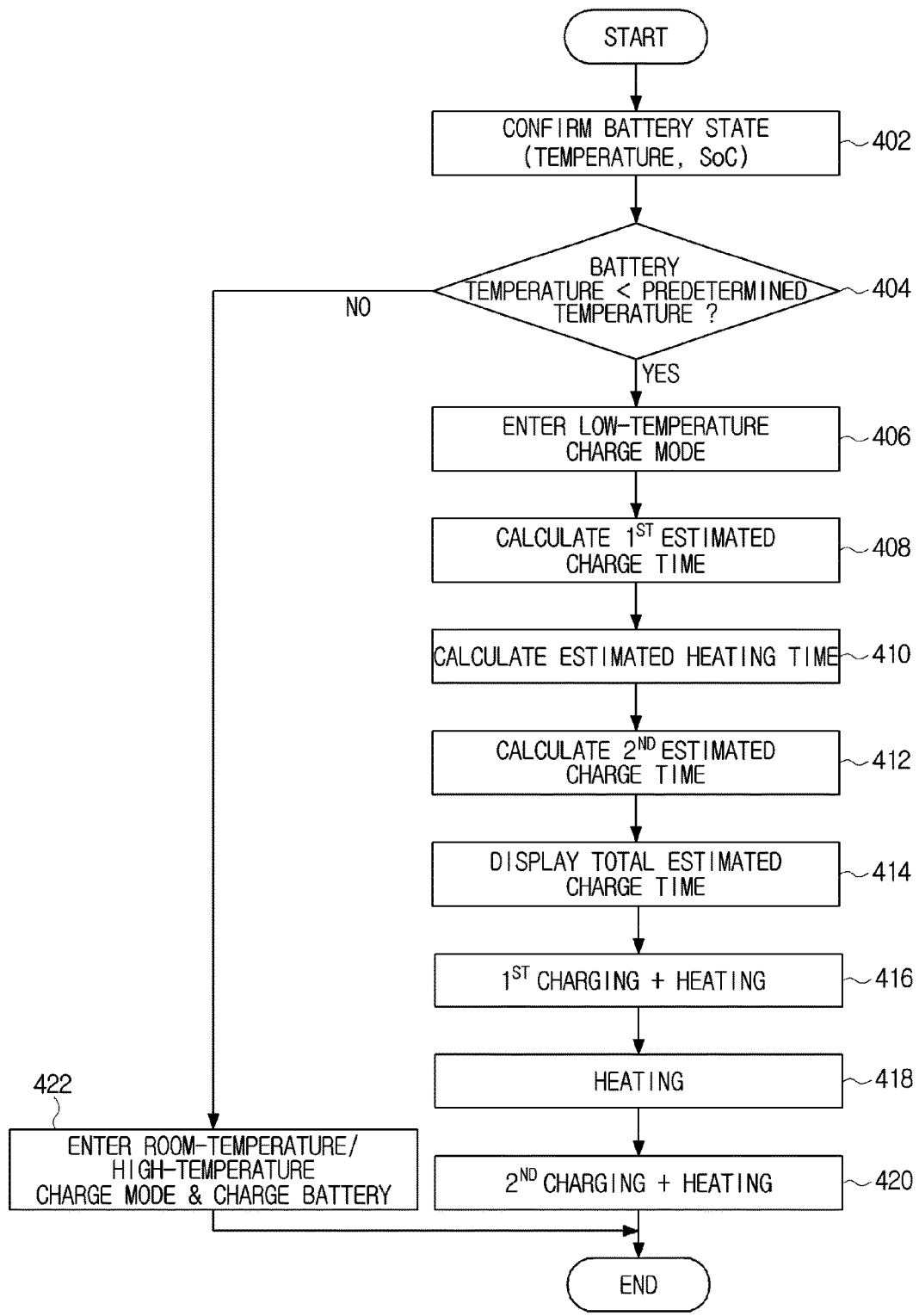
FIG. 4 is a flowchart illustrating a method for charging the battery of the vehicle according to an embodiment of the present disclosure.

FIG. 4 is a flowchart illustrating a method for charging the battery of the vehicle according to an embodiment of the present disclosure.

Referring to FIG. 4, the ECU 202 may first confirm a state of the battery 102 (Operation 402). That is, the ECU 202 may measure a temperature and SoC of the battery 102, and may store the measured temperature and SoC of the battery 102 in the memory 214.

Subsequently, the ECU 202 may compare the temperature of the battery 102 with a predetermined temperature, and may determine whether the battery temperature is less than the predetermined temperature (Operation 404). The operation for comparing the battery temperature with the predetermined temperature may be used to determine whether to perform a low-temperature charge mode according to the temperature of the battery 102.

If the temperature of battery 102 is less than the predetermined (Operation 404), the ECU 202 may change a charge mode of the battery 102 to a low-temperature charge mode (Operation 406). In contrast, if the battery temperature is equal to or higher than the predetermined temperature (Operation 404), the ECU 202 may enter a room-temperature/high-temperature charge mode and thus charge the battery 102 with electricity (Operation 422).

After entering the low-temperature charge mode, the ECU 202 may first calculate a primary estimated charge time to calculate a total estimated charge time needed to charge the battery 102 with the maximum SoC (Operation 408). An execution time of the <1st charging+heating> process may be calculated on the basis of not only the battery temperature at a charging start time of the battery 102 but also the maximum constant voltage of a constant voltage mode.

Subsequently, the ECU 202 may calculate an estimated heating time in the next process for calculating a total estimated charge time needed to charge the battery 102 with the maximum SoC (Operation 410). A consumption time needed for heating the battery 102 to charge the battery 102 with the maximum SoC value, and a time needed to heat the battery 102 from the start temperature to a target temperature may be guaranteed in advance through experimental processing, and may be configured in the form of a lookup table.

Subsequently, the ECU 202 may calculate a secondary estimated charge time in the last process for calculating a total estimated charge time needed to the battery 102 with the maximum SoC value (Operation 412). The time to be consumed for secondary charging may be calculated in consideration of not only the battery SoC obtained when primary charging is completed, but also the maximum SoC of the battery 102.

The ECU 202 may calculate a total estimated charge time by summing the calculated primary estimated charge time, the calculated estimated heating time, and the calculated secondary estimated charge time, and may display the calculated total estimated charge time on the display or the like (Operation 414). A driver and passengers of the vehicle 100 may recognize an estimated time to fully charge the battery 102 through the total estimated charge time displayed on the display, and may reflect the recognized estimated time in a navigation plan of the vehicle 100.

If calculating and displaying of the total estimated charge time are completed, the ECU 202 may perform the <1st charging+heating> process (Operation 416). Since the battery 102 having a relatively low temperature is in the low-temperature charge mode for charging the battery 102, the ECU 202 may start charging the battery with the upper limit value of the constant voltage mode according to the amount of a charge current corresponding to the corresponding temperature.

If the battery 102 starts charging, charging of the battery 102 and a heating system of the battery 102 may simultaneously operate. That is, the battery 102 starts charging and, at the same time, the heating system for heating the battery 102 is operated, resulting in increased temperature of the battery 102.

The battery 102 may be charged with a maximum of a constant voltage corresponding to a current temperature (low temperature), and the <1st charging+heating> process is completed. Since the battery 102 is currently in the low-temperature charge mode and the battery 102 does not have a sufficiently high temperature, the <1st charging+heating> process is completed under the condition that the battery 102 is not fully charged with the maximum SoC value.

Subsequently, the ECU 202 may heat the battery 102 so as to increase the battery temperature without charging the battery 102 (Operation 418). In the heating process, the ECU 202 may sufficiently heat the battery 102 in a manner that the battery 102 can be charged with the maximum SoC value.

Upon completion of the <heating> process, the ECU 202 may start secondary charging of the battery 102, and may continuously heat the battery 102. If the battery 102 is at a sufficiently high temperature, the heating process of the battery 102 may be omitted during secondary charging.

Since the battery 102 is at a sufficiently high temperature during secondary charging, the battery 102 may be charged with a maximum constant value (or the maximum SoC) of the constant voltage mode.

If the secondary charging is completed, this means that the battery 102 was charged with the maximum SoC, such that the battery charging is completed and information indicating the completed charging of the battery 102 may be displayed on the display.

As is apparent from the above description, the vehicle and the method for controlling the same according to the embodiments of the present disclosure can increase the amount of charges of a battery even at a low temperature, and can calculate an estimated consumption time needed to charge the battery.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method for charging a battery of a vehicle, the method comprising:

measuring a current temperature of the battery;

performing a first charging process in which the battery is charged with a maximum amount of charges corresponding to the current temperature of the battery and simultaneously performing a first heating so that the battery is being heated while performing the first charging process;

performing a second heating process in which the battery is heated without charging of the battery; and performing a second charging process in which, when the maximum amount of charges of the battery increases by heating of the battery, the battery is further charged with the increased maximum amount of charges, wherein the first charging process, the second heating process and the second charging process are performed continuously.

2. The method according to claim 1, further comprising:

calculating a total estimated charge time needed for the first charging process, the second heating process, and the second charging process; and displaying the calculated estimated charge time.

3. The method according to claim 2, further comprising calculating an estimated charge time of the first charging process based on a maximum constant voltage corresponding to an initial temperature of the battery and an amount of a charge current.

4. The method according to claim 2, wherein a time needed to heat the battery from an initial temperature to a target temperature of the battery is known in advance through experimental processing, and an estimated heating time of the second heating process is calculated based on a result of the experimental processing.

5. The method according to claim 2, wherein an estimated charge time of the second charging process is calculated by considering a state of charge of the battery obtained when the first charging process is completed and also a maximum state of charge of the battery.

6. The method according to claim 1, further comprising performing the first charging process, the second heating process, and the second charging process during a low-temperature charge mode.

7. The method according to claim 6, further comprising entering the low-temperature charge mode when the battery has a temperature less than a predetermined temperature.

8. A method for charging a battery of a vehicle, the method comprising:

measuring a current temperature of the battery;

calculating a total estimated charge time to be consumed for performing a first charging process, a second heating process, and a second charging process, and displaying the total estimated charge time;

performing the first charging process in which the battery is charged with a maximum amount of charges corresponding to the current temperature of the battery and simultaneously performing a first heating so that the battery is being heated during the first charging process;

performing the second heating process in which the battery is heated without charging of the battery; and performing a second charging process in which, when the maximum amount of charges of the battery increases by heating of the battery, the battery is further charged with the increased maximum amount of charges, wherein the first charging process, the second heating process and the second charging process are performed continuously.

9. The method according to claim 8, further comprising calculating an estimated charge time of the first charging process based on a maximum constant voltage corresponding to an initial temperature of the battery and the amount of a charge current.

10. The method according to claim 8, further comprising performing experimental processing to acquire a time needed to heat the battery from an initial temperature to a target temperature of the battery, the experimental processing being performed before calculating the total estimated charge time and before performing the first charging process, the second heating process, and the second charging process.

11. The method according to claim 10, further comprising calculating an estimated heating time of the battery based on a result of the experimental processing.

12. The method according to claim 8, further comprising calculating an estimated heating time of the battery on based on result of experimental processing that was previously performed to acquire a time needed to heat the battery from an initial temperature to a target temperature of the battery.

13. The method according to claim 8, further comprising calculating an estimated charge time of the second charging process by considering a state of charge of the battery obtained when the first charging process is completed and also a maximum state of charge of the battery.

14. The method according to claim 8, further comprising performing the first charging process, the second heating process, and the second charging process during a low-temperature charge mode.

15. The method according to claim 14, further comprising entering the low-temperature charge mode when the battery has a temperature less than a predetermined temperature.

16. A method for charging a battery of a vehicle, the method comprising:
    measuring a current temperature of the batter;
    calculating an estimated charge time of a first charging process based on a maximum constant voltage corresponding to the current temperature of the battery of the vehicle and an estimated charge time;
    calculating an estimated heating time of a second heating process based on a result of experimental processing that was previously performed to acquire a time needed to heat the battery from the current temperature to a target temperature;
    calculating an estimated charge time of a second charging process by considering both a state of charge of the battery obtained when the first charging process is completed and also a maximum state of charge of the battery;
    summing an estimated consumption time of the first charging process, an estimated consumption time of the second heating process, and an estimated consumption time of the second charging process so as to calculate a total estimated charge time;
    displaying the calculated total estimated charge time;
    performing the first charging process in which the battery is charged with a maximum amount of charges corresponding to the current temperature of the battery and simultaneously performing a second heating process so that the battery is being heated while performing the first charging process;
    performing the second heating process in which the battery is heated without being charged; and
    performing the second charging process in which, when the maximum amount of charges of the battery increases by heating of the battery, the battery is further charged with the increased maximum amount of charges, wherein the first charging process, the second heating process and the second charging process are performed continuously.

* * * * *